US012073537B1

(12) United States Patent
Zhou et al.

(10) Patent No.: US 12,073,537 B1
(45) Date of Patent: Aug. 27, 2024

(54) IMAGE DATA ENHANCEMENT METHOD AND APPARATUS, COMPUTER DEVICE, AND STORAGE MEDIUM

(71) Applicant: SUZHOU METABRAIN INTELLIGENT TECHNOLOGY CO., LTD., Jiangsu (CN)

(72) Inventors: Zhenzhen Zhou, Jiangsu (CN); Feng Li, Jiangsu (CN); Hongli Liu, Jiangsu (CN); Xiaolan Zhang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/692,779

(22) PCT Filed: May 26, 2022

(86) PCT No.: PCT/CN2022/095376
§ 371 (c)(1),
(2) Date: Mar. 15, 2024

(87) PCT Pub. No.: WO2023/130648
PCT Pub. Date: Jul. 13, 2023

(30) Foreign Application Priority Data

Jan. 10, 2022 (CN) .......................... 202210021970.4

(51) Int. Cl.
*G06T 5/00* (2024.01)
*G06T 3/40* (2006.01)
(Continued)

(52) U.S. Cl.
CPC .................. *G06T 5/50* (2013.01); *G06T 3/40* (2013.01); *G06T 7/10* (2017.01); *G06T 2207/20016* (2013.01); *G06T 2207/20221* (2013.01)

(58) Field of Classification Search
CPC . G06T 2207/20084; G06T 2207/20221; G06T 7/11; G06T 5/80; G06T 7/536; G06V 10/26; G06V 10/273
See application file for complete search history.

(56) References Cited

U.S. PATENT DOCUMENTS 9,179,035 B2 * 11/2015 Kurilin ................ H04N 1/3873
10,672,165 B1   6/2020 Baron
(Continued)

FOREIGN PATENT DOCUMENTS

CN       111210411 A    5/2020
CN       111784588 A   10/2020
(Continued)

OTHER PUBLICATIONS

Guillou, Erwan, et al. "Using vanishing points for camera calibration and coarse 3D reconstruction from a single image." The Visual Computer 16 (2000): 396-410. (Year: 2000).*

Kocur, Viktor, and Milan Ftáčnik. "Detection of 3D bounding boxes of vehicles using perspective transformation for accurate speed measurement." Machine Vision and Applications 31.7 (2020): 62. (Year: 2020).*

(Continued)

*Primary Examiner* — Li Liu
(74) *Attorney, Agent, or Firm* — Merchant & Gould P.C.

(57) ABSTRACT

An image data enhancement method and apparatus, a computer device, and a storage medium are provided. The method includes: segmenting an original image to obtain segmented images and target categories of the segmented images, and obtaining, by means of the target categories, categories to be enhanced (S1); binarizing the original image according to the categories to be enhanced, and obtaining instance images, according to a connected domain of the binary images, from the original image (S2); performing perspective processes on the instance images to obtain first instance images, and zooming the first instance images to obtain second instance images (S3); obtaining a vanishing point position from the original image, determining pasting positions of the second instance images according to the (Continued)

vanishing point position and the second instance images, and pasting the second instance images to the original image according to the pasting positions to obtain an enhanced image (S4).

20 Claims, 5 Drawing Sheets

(51) Int. Cl.
  *G06T 5/50* (2006.01)
  *G06T 7/10* (2017.01)

(56) References Cited

U.S. PATENT DOCUMENTS

| | | | |
|---|---|---|---|
| 2002/0118883 | A1 | 8/2002 | Bhatt |
| 2007/0165108 | A1* | 7/2007 | Yuasa ................ B60R 1/26 348/148 |
| 2013/0052130 | A1 | 2/2013 | Davis |
| 2019/0340798 | A1* | 11/2019 | Garg ................ G06T 7/143 |
| 2023/0135512 | A1* | 5/2023 | Xu ................ G06T 5/70 348/148 |

FOREIGN PATENT DOCUMENTS

| | | | |
|---|---|---|---|
| CN | 111815528 | A | 10/2020 |
| CN | 112200045 | A | 1/2021 |
| CN | 114037637 | A | 2/2022 |
| WO | 2021041719 | A1 | 3/2021 |

OTHER PUBLICATIONS

International Search Report and Written Opinion issued for International Patent Application No. PCT/CN2022/095376 mailed Oct. 11, 2022 with English translation.
Chinese Search Report issued for Chinese Patent Application No. 2022100219704 dated Feb. 18, 2022, without English translation.
Chinese Search Report issued for Chinese Patent Application No. 2022100219704 dated Mar. 10, 2022, without English translation.
Chen et al., "The algorithm of multi-level image enhancement based on wavelet transform," Journal of Changsha University of Science and Technology (Natural Science) 3(2): 4 pages, with English abstract (2006).
Luo et al., "Method of Image Perspective Transform Based on Double Vanishing Point," Computer Engineering 35(15): 3 pages, with English abstract (2009).
Sun et al., "Hierarchical real-time vanishing point detection based on holistic image feature," Journal of Image and Graphics 18(7): 11 pages, with English abstract (2013).
Xu, Feng., "Photoshop CS2," 3 pages, without English translation (2006).
Zhang et al., "Traffic Images Enhancement Based on Vanishing Point Detection and Atmospheric Scattering Model," 2010 3rd International Congress on Image and Signal Processing (CISP2010): 5 pages.
"(Machine Translated) The vanishing point that cannot be ignored and the ingenious restoration of the image perspective plane is a good hand," baijiahao.baidu.com blog post, with English machine translation (2020).

* cited by examiner

IMAGE DATA ENHANCEMENT METHOD AND APPARATUS, COMPUTER DEVICE, AND STORAGE MEDIUM

CROSS-REFERENCE TO RELATED APPLICATION

The present application is a National Stage Application of PCT International Application No.: PCT/CN2022/095376 filed on May 26, 2022, which claims priority to Chinese Patent Application 202210021970.4, filed in the China National Intellectual Property Administration on Jan. 10, 2022, the disclosure of which is incorporated herein by reference in its entirety.

TECHNICAL FIELD

The present application relates to the technical field of image processing, and in particular, to an image data enhancement method and apparatus, a computer device, and a storage medium.

BACKGROUND

An image segmentation technology is commonly used to locate positions of targets and boundaries in images, which lays a foundation for understanding image contents. This technology has become an important research direction in the field of computer vision and is widely used in practical scenarios such as mobile robots, autonomous driving, unmanned aerial vehicles, and medical diagnosis. The applicant realizes that the current image segmentation technology is mainly achieved through a deep learning algorithm, and the performance of the deep learning algorithm depends heavily on the quality of input data. Therefore, data enhancement is usually used to handle situations where the quality of input data is poor. However, during image enhancement, current data augmentation methods have problems of unreasonable data enhancement, difficulty in recognizing small samples, and the like.

SUMMARY

The present application provides an image data enhancement method and apparatus, a device, and a storage medium.

According to one aspect, an image data enhancement method is provided. The image data enhancement method includes:
  an original image is segmented to obtain segmented images and target categories of the segmented images, and categories to be enhanced are obtained by means of the target categories;
  the original image is binarized according to the categories to be enhanced to obtain binary images, and instance images having a matching relationship with the categories to be enhanced are obtained, according to a connected domain of the binary images, from the original image;
  perspective processes are performed on the instance images to obtain first instance images, and the first instance images are zoomed to obtain second instance images; and
  a vanishing point position is obtained from the original image, pasting positions of the second instance images are determined according to the vanishing point position and geometric sizes of the second instance images, and the second instance images are pasted to the original image according to the pasting positions to obtain an enhanced image of the original image.

In some implementations, the step of an original image is segmented to obtain segmented images and target categories of the segmented images includes:
  feature extraction is performed on the original image to obtain a multilayer semantic feature of the original image;
  the multilayer semantic feature is convoluted and downsampled according to a preset sampling rate to obtain a first sampled feature; and
  the first sampled feature is upsampled to obtain a second sampled feature, the second sampled feature is fused with the multilayer semantic feature to obtain a third sampled feature, and the third sampled feature is convoluted and downsampled to obtain the segmented images and the target categories corresponding to the segmented images.

In some implementations, the step of categories to be enhanced is obtained by means of the target categories includes:
  the segmented images are analyzed, by means of a confusion matrix, according to the target categories to obtain recognition accuracies of the target categories;
  the recognition accuracies of the target categories are compared with a preset first threshold, and a corresponding target category with the recognition accuracy less than the first threshold is taken as a first target category;
  the numbers of pixels of the target categories are compared with a preset second threshold, and a corresponding target category with the number of pixels less than the second threshold is taken as a second target category; and the first target categories are fused with the second target categories to obtain the categories to be enhanced.

In some implementations, the step of the original image is binarized according to the categories to be enhanced to obtain binary images, and instance images having a matching relationship with the categories to be enhanced are obtained, according to a connected domain of the binary images, from the original image includes:
  mask matrixes are built according to the categories to be enhanced and a matrix size of the original image, and matrix multiplication operations are performed on elements of the mask matrixes and elements of the original image to obtain the binary images;
  connected domain states of the binary images are obtained according to a preset pixel adjacency relationship; and
  local images corresponding to the categories to be enhanced are obtained, according to the connected domain states, from the original image, and regions of interest of the local images are cut to obtain the instance images, and a plurality of the instance images corresponding to the categories to be enhanced are separately stored.

In some implementations, the step of perspective processes are performed on the instance images to obtain first instance images includes:
  first coordinate vertexes of the instance images and second coordinate vertexes of the first instance images are configured, and perspective transformation matrixes of the instance images are obtained according to the first coordinate vertexes and the second coordinate vertexes; and perspective transformation processing is performed on the instance images according to the perspective transformation matrixes to obtain the first instance images.

In some implementations, the step of the first instance images are zoomed to obtain second instance images includes:

geometric sizes of a plurality of the first instance images corresponding to the categories to be enhanced are obtained, wherein each geometric size includes: a maximum size value, a minimum size value, and an average size value;

a zooming threshold is obtained according to the average size value;

a zooming interval is obtained according to the maximum size value and the minimum size value; and the current first instance images of the categories to be enhanced are traversed, and the first instance images are zoomed to obtain the second instance images according to the zooming threshold and the zooming interval.

In some implementations, the step of a vanishing point position is obtained from the original image, pasting positions of the second instance images are determined according to the vanishing point position and geometric sizes of the second instance images includes:

the vanishing point position of the original image is obtained according to calibration information of the original image; and a first region is obtained by taking the vanishing point position as a circle center and taking the maximum size value of the second instance images as a radius, and the pasting positions are selected from a second region, wherein the original image includes the first region and the second region.

According to another aspect, an image data enhancement apparatus is provided. The image data enhancement apparatus includes:

a category obtaining module, configured to: segment an original image to obtain segmented images and target categories of the segmented images, and obtain, by means of the target categories, categories to be enhanced;

an instance obtaining module, configured to: binarize the original image according to the categories to be enhanced to obtain binary images, and obtain, according to a connected domain of the binary images, from the original image, instance images having a matching relationship with the categories to be enhanced;

a correction processing module, configured to: perform perspective processes on the instance images to obtain first instance images, and zoom the first instance images to obtain second instance images; and a data enhancement module, configured to: obtain a vanishing point position from the original image, determine pasting positions of the second instance images according to the vanishing point position and geometric sizes of the second instance images, and paste the second instance images to the original image according to the pasting positions to obtain an enhanced image of the original image.

According to still another aspect, a computer device is provided. The computer device includes a memory and one or more processors, wherein the memory stores computer-readable instructions; and the computer-readable instructions, in respond to executed by the processors, cause the one or more processors to perform the steps of any one of the image data enhancement methods described above is performed.

According to yet another aspect, the present application further provides one or more non-volatile computer-readable storage media storing computer-readable instructions, wherein the computer-readable instructions, in respond to executed by one or more processors, cause the one or more processors to perform the steps of any one of the image data enhancement methods described above.

The details of one or more embodiments of the present application are presented in the accompanying drawings and description below. Other features and advantages of the present application will become apparent from the specification, accompanying drawings, and claims.

DETAILED DESCRIPTION OF THE EMBODIMENTS

In order to make the objectives, technical solutions, and advantages of the present application clearer, the following is a further detailed explanation of the present application in conjunction with the accompanying drawings and embodiments. It should be understood that the specific embodiments described here are only intended to explain the present application and are not intended to limit the present application.

Figure 1:
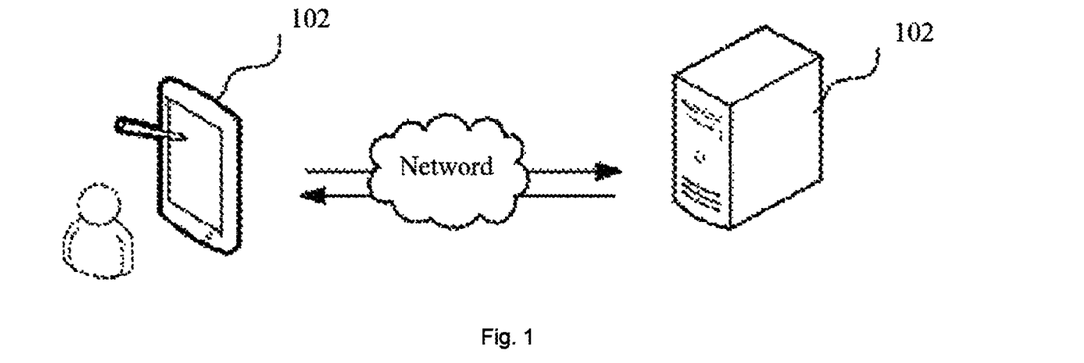
FIG. 1 is a diagram of an application environment of an image data enhancement method according to one or more embodiments.

An image data enhancement method provided in the present application can be applied to an application environment as shown in FIG. 1. A terminal 102 communicates with a server 104 through a network. For example, the image data enhancement method provided in the present application can be applied to a scenario of performing data enhancement on image samples with imbalanced target categories. Based on Atrous Spatial Pyramid Pooling (ASPP) and perspective transformation, the problems of sample imbalance during enhancement of image data, poor perspective rationality of enhanced images in the existing image data enhancement technology, and the like are improved. Instance images are obtained by performing binarization and connected domain analysis on an original image; then, perspective and zooming processing are performed on the instance images to obtain second instance images; pasting positions are obtained according to geometric sizes of the second instance images and a vanishing point position of the original image; and finally, the second instance images are pasted to the original image according to the pasting positions to obtain an enhanced image. The terminal 102 can be, but is not limited to, various personal computers, laptops, smartphones, tablets, portable wearable devices, or sub-servers. The server 104 can be implemented using an independent server or a server cluster composed of a plurality of servers or a cloud computing platform.

Figure 2:
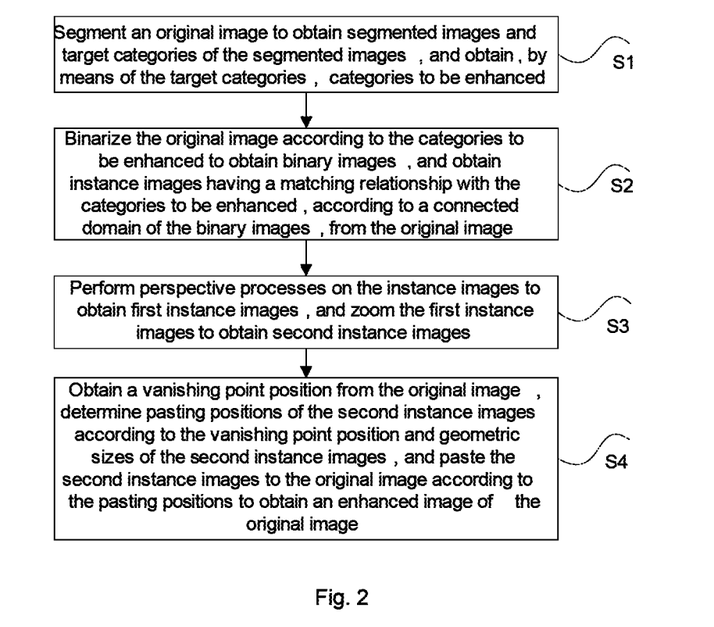
FIG. 2 is a flowchart of an image data enhancement method according to one or more embodiments.

In an embodiment, as shown in FIG. 2, an image data enhancement method includes the following steps:

S1: An original image is segmented to obtain segmented images and target categories of the segmented images, and categories to be enhanced is obtained by means of the target categories.

S2: The original image is binarized according to the categories to be enhanced to obtain binary images, and instance images having a matching relationship with the categories to be enhanced are obtained, according to a connected domain of the binary images, from the original image.

S3: Perspective processes are performed on the instance images to obtain first instance images, and the first instance images are zoomed to obtain second instance images.

S4: A vanishing point position is obtained from the original image; pasting positions of the second instance images are determined according to the vanishing point position and geometric sizes of the second instance images; and the second instance images are pasted to the original image according to the pasting positions to obtain an enhanced image of the original image.

Through the above step, the problem of low performance during enhancement of image data may be improved.

Before the enhancement of the image data, the original image needs to be segmented, and the target categories of the segmented images are compared and analyzed to determine the target categories that require data enhancement processing. In step S1, as an example, the original image is segmented to obtain the segmented images and the target categories corresponding to the segmented images, thus obtaining the categories to be enhanced. For example, a data set of the original image is trained in an image segmentation network, and a deep neural network feature extraction module is constructed using dilated convolution to obtain a semantic feature of the original image. ASPP is used to perform the dilated convolution and sampling on feature information to obtain image context information in different ratios. Then, the semantic feature is fused with the image context information, and the segmented images are obtained by means of convolution in a preset size and sampling at a preset multiple. In some implementation process, the preset size used during the convolution can be set to be 3*3. The preset multiple used during the sampling can be set to be 4 times. Existing target categories are determined according to the segmented images, and confusion matrix analysis is performed on the segmented images. Prediction results of all the categories of the segmented images are compared with a real result of the original image. A certain number of target categories are selected, according to a preset comparison dimension, from the target categories as the categories to be enhanced. The comparison dimension at least includes one of the following: the numbers of pixels of the target categories and recognition accuracies of the target categories, so as to improve sample imbalance. The target categories are specifically selected for data enhancement.

After the categories to be enhanced is obtained, the instance images corresponding to the categories to be enhanced needs to be selected from the original image. In step S2, as an example, the original image is binarized to obtain the binary images; the connected domain analysis is performed on the binary images to obtain the instance images having the matching relationship with the categories to be enhanced, in the original image. For example, starting from the first image of the original image, the original image is binarized according to the category to be enhanced, and a mask matrix is constructed. Matrix multiplication operation is performed on the mask matrix and the original image to obtain the binary image; the connected domain analysis is performed on the binary image to obtain a connected domain diagram; a corresponding local image in the original image is extracted and is cut to obtain a region of interest and cut away a meaningless region from the image, and the instance image is obtained; the same operation is performed on all the images in the original image; the instance images corresponding to the various categories to be enhanced are extracted, and different instance images of different categories to be enhanced are separately stored, so as to specifically select the corresponding instance images from the original image according to the categories to be enhanced. That is, the target categories are screened to improve the imbalance of samples.

After the instance images corresponding to the various categories to be enhanced are obtained, in order to consider the authenticity of the instance images and ensure the perspective rationality of the instance images, in step S3, as an example, perspective processes are performed on the instance images to obtain the first instance images, and the first instance images are zoomed to obtain the second instance images. For example, a perspective transformation function in an Open source Computer Vision library (OpenCV) image processing library can be used to perform the perspective processes on the instance images to obtain the first instance images with rational perspective. Then, the geometric size of the instance image corresponding to a target category with the highest recognition accuracy can be used as a comparison reference, and the geometric sizes of all the first instance images can be matched with the comparison reference; the first instance images with larger geometric sizes are zoomed out, and the first instance images with smaller geometric sizes are zoomed in, so as to obtain the second instance images to further ensure the authenticity and perspective rationality of the instance images.

Before the second instance images are pasted to the original image, the vanishing point in the original image needs to be determined, and the pasting positions of the second instance images in the original image needs to be calculated. In step S4, as an example, the vanishing point position is obtained from the original image, and the pasting positions of the second instance images are determined according to the vanishing point position and the geometric size of the second instance images. The second instance images are then pasted to the original image according to the pasting positions to obtain the enhanced image of the original image, for example, the vanishing point position in the original image can be confirmed by means of calibration information of a camera, or the vanishing point position can be obtained by means of Hough transformation. Then, a region where pasting is forbidden is formed in the original image according to the vanishing point position in the original image. A position of a pasting point is randomly selected from a place beyond the region, and the second instance image is pasted to the original image according to the position of the pasting point to obtain the enhanced image corresponding to the original image. In some implementation processes, a plurality of second instance images can be pasted to the original image to achieve data amplification on the original image with a small number of samples, which improves the recognition accuracy of small samples and ensures the perspective rationality of the enhanced image.

In some other implementation processes, the above image data enhancement method can also be applied to the data enhancement process in the field of target detection.

Figure 3:
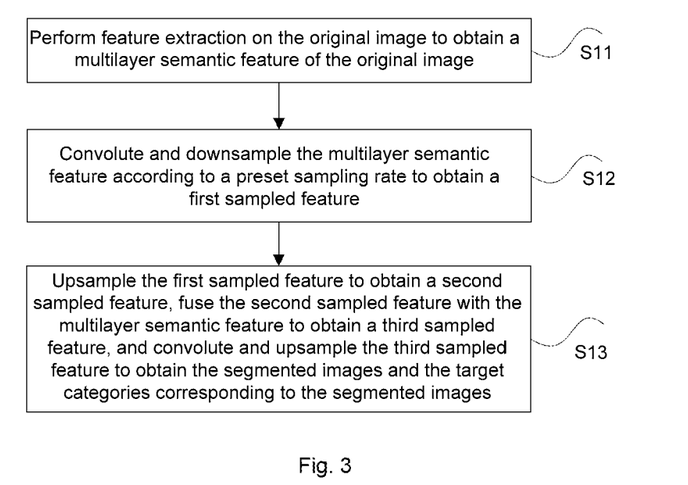
FIG. 3 is a flowchart of obtaining segmented images and target categories thereof according to one or more embodiments.

Before the image data enhancement, the target categories for data enhancement need to be selected, so that the segmented images of the original image and the target categories corresponding to the segmented images need to be obtained. In some embodiments, as shown in FIG. 3, the step that an original image is segmented to obtain segmented images and target categories of the segmented images includes:

S11: Feature extraction is performed on the original image to obtain a multilayer semantic feature of the original image.

S12: The multilayer semantic feature is convoluted and downsampled according to a preset sampling rate to obtain a first sampled feature.

S13: The first sampled feature is upsampled to obtain a second sampled feature, the second sampled feature is fused with the multilayer semantic feature to obtain a third sampled feature, and the third sampled feature is convoluted and downsampled to obtain the segmented images and the target categories corresponding to the segmented images.

As shown in FIG. 3, in step S11, in an exemplified description, the feature extraction is performed on the original image to obtain the multilayer semantic feature of the original image. For example, a Deep Laboratory Version 3.0+(DeepLabV3+) segmentation network framework can be used; the deep neural network feature extraction module is constructed using dilated convolution in the encoding step to extract the multilayer semantic feature of the original image. It may increase the receptive field of the network, maintain the resolution of the feature, and improve the accuracy of semantic segmentation. In some implementation processes, a Meta Pruning (MetaPrune) framework can also be used to perform automatic channel cutting on a backbone network in the segmentation network framework, thereby reducing the size of a model and maintaining an accuracy level of the model. The multilayer semantic feature of the original image is obtained.

As shown in FIG. 3, in step S12, in an exemplified description, the multilayer semantic feature is convoluted and downsampled according to the preset sampling rate to obtain the first sampled feature. For example, the ASPP is used to sample the multilayer semantic feature by the dilated convolution at different sampling rates, to capture multi-scale information and obtain image context information with different proportions at multiple levels as the first sampled feature. As the same object may have different proportions in the image, using the ASPP can help consider the proportions of different objects and capture more dimension information. In some implementation processes, a convolution parameter can be set to 3*3 dilated convolution with the sampling rate of 6, or to 3*3 dilated convolution with the sampling rate of 12, so as to downsample semantic feature in different situations of the image.

As shown in FIG. 3, in step S13, in an exemplified description, the first sampled feature is fused with the multilayer semantic feature after being upsampled, so as to obtain the third sampled feature. The third sampled feature is convoluted and upsampled to obtain the segmented images and the target categories corresponding to the segmented images. For example, the first sampled feature is upsampled four times. The interpolation method is used to interpolate new pixels between pixel points in a first sampled feature map, so as to enlarge the first sampled feature and obtain the second sampled feature. Then, the second sampled feature is fused with the multilayer semantic feature using a concat function to obtain the third sampled feature. Then, the third sampled feature is convoluted by 3*3 and upsampled four times to obtain the segmented images; the segmented images are analyzed to distinguish different objects in the segmented images. For example, humans, animals, plants, equipment, and other objects in the segmented images are used as different target categories, so as to subsequently specifically select the target categories that requires data enhancement from all the target categories.

Figure 4:
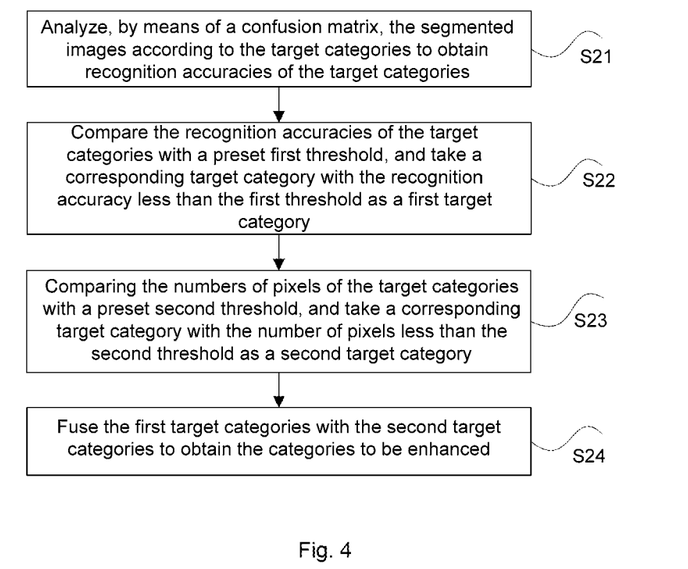
FIG. 4 is a flowchart of obtaining categories to be enhanced according to one or more embodiments.

After the target categories of the segmented images are obtained, some target categories need to be specifically selected from all the target categories as the categories to be enhanced, as shown in FIG. 4. In some embodiments, the step that a categories to be enhanced is obtained by means of the target categories include:

S21: The segmented images are analyzed, by means of a confusion matrix, according to the target categories to obtain recognition accuracies of the target categories.

S22: The recognition accuracies of the target categories are compared with a preset first threshold, and a corresponding target category with the recognition accuracy less than the first threshold is taken as a first target category.

S23: The numbers of pixels of the target categories are compared with a preset second threshold, and a corresponding target category with the number of pixels less than the second threshold is taken as a second target category.

S24: The first target categories are fused with the second target categories to obtain the categories to be enhanced.

As shown in FIG. 4, in step S21, in an exemplified description, the segmented images are analyzed according to the target categories by means of the confusion matrix to obtain the recognition accuracies of the target categories. For example, the confusion matrix is established, wherein each row represents an actual category, and each column represents a prediction result of each category. Records in a data set are summarized in a matrix form according to the actual categories and the prediction results made by a classification model, which can present prediction values of all the categories and results of correct recognition or category confusion of the actual categories. In some implementation processes, for a binary classification case for gender, when an actual category is male and a prediction result is male, the result is referred to as True Positive (TP); when an actual category is female and a prediction result is female, the result is referred to as True Negative (TN); when an actual category is male and a prediction result is female, the result is referred to as False Negative (FN); and when an actual category is female and a prediction result is male, the result is referred to as false Positive (FP). In this case, a mathematical expression of the accuracy of male recognition in the classification model is $p=TP/(TP+FP)$, and a mathematical expression of the recall rate is $r=TP/(TP+FN)$. In this embodiment, the accuracies, by means of confusion matrix analysis, the recall rates, and the like of the target categories may be obtained, which can be used to evaluate the performance of a recognition model and used as the recognition accuracy.

As shown in FIG. 4, in step S22, in an exemplified description, the recognition accuracies of the target categories are compared with the preset first threshold, and the corresponding target category with the recognition threshold less than the first threshold value is taken as the first target category. For example, in some implementation processes, the first threshold T1 can be preset to be 70%; the recognition accuracies of all the target categories are compared with the first threshold, and the target category with the recognition accuracy less than the first threshold is taken as the first target category. In some other implementation processes, the first threshold can also be set to be 80%, that is, by adjusting the first threshold, a judging criteria for selecting the first target category from all the target categories can be correspondingly liberalized or restricted, so as to select for the number of the target categories and the problems of sample imbalance and the like, some of the target categories in the targeted manner for data enhancement.

As shown in FIG. 4, in step S23, in an exemplified description, the numbers of pixels of the target categories are compared with the preset second threshold, and the corresponding target category with the number of pixels less than the second threshold is taken as the second target category. For example, since the segmented images may include a target category that has both a small number of pixels and low recognition accuracy, the target category with a small number of pixels can be taken as a target category that needs to be enhanced. In some implementation processes, a minimum value Nmin of the number of pixels, a maximum value Mmax of the number of pixels, and a mean value Nmean of the number of pixels of the local images corresponding to all the target categories are calculated, and then the second threshold T2 is preset. For each target category, if the value of the number of pixels of the local image of the target category is less than T2*Mmean, it is considered that the number of pixels of the target category is smaller among all the target categories, and the category is taken as the second target category. In some implementation processes, the second threshold T2 can be set to be 0.8 or 0.75, which means that a setting range of the second threshold can be [0.7, 0.9]. By adjusting the value of the second threshold T2, a screening condition for selecting different target categories as the second target category can be specifically controlled, which more effectively selects appropriate target categories as the target categories that subsequently requires data enhancement, so as to solve the problem of inaccurate small sample recognition.

As shown in FIG. 4, in step S24, in an exemplified description, the first target categories are fused with the second target categories to obtain the categories to be enhanced. For example, the first target categories are combined with the second target categories. In some implementation processes, if there may be the same target category among the first target categories and the second target categories, elements in the first target categories are merged with elements in the second target categories to obtain the categories to be enhanced. In some other implementation processes, weight allocation can also be performed on all elements in the category to be enhanced. For example, a larger weight is allocated to a target category element if the element in the first target category and in the second target category are the same; and a smaller weight is allocated to a target category element that only appears in the first target category or the second target category. In this way, the target categories to be enhanced are distinguished and controlled in two dimensions: the recognition accuracy and the number of pixels, so as to improve the sample imbalance.

Figure 5:
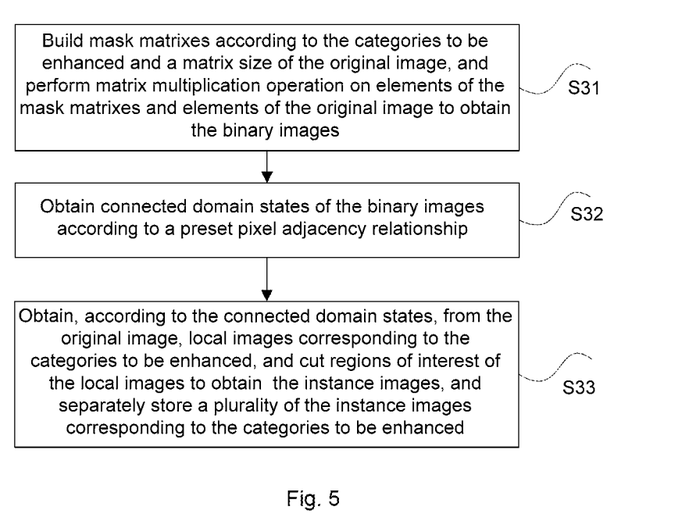
FIG. 5 is a flowchart of obtaining instance images according to one or more embodiments.

After the categories to be enhanced is obtained, local images corresponding to the categories to be enhanced needs to be selected from the original image as the instance images. As shown in FIG. 5, the step that the original image is binarized according to the categories to be enhanced to obtain binary images, and instance images having a matching relationship with the categories to be enhanced are obtained, according to a connected domain of the binary images, from the original image includes:

S31: Mask matrixes are built according to the categories to be enhanced and a matrix size of the original image, and matrix multiplication operations are performed on elements of the mask matrixes and elements of the original image to obtain the binary images.

S32: Connected domain states are obtained by performing connected domain analysis on the binary images according to a preset pixel adjacency relationship.

S33: Local images corresponding to the categories to be enhanced are obtained, according to connected domain states, from the original image, regions of interest of the local images are cut to obtain the instance images, and a plurality of the instance images corresponding to the categories to be enhanced are separately stored.

Through the above step, the instance images can be specifically obtained from the original image to improve the problem of the sample imbalance.

As shown in FIG. 5, in step S31, in an exemplified description, the mask matrixes are built according to the categories to be enhanced and the matrix size of the original image, and the matrix multiplication operations are performed on the elements of the mask matrixes and the elements of the original image to obtain the binary images. For example, by performing a mask operation, a mask matrix composed of 0 and 1 can be built for each category to be enhanced as the mask matrix, and the matrix multiplication operation is performed on various elements of the mask matrix and all types of elements in all rows of the original image; each pixel value of the original image is recalculated, so that the local image can be shielded, and an image processing region can be controlled. The size of the mask matrix is consistent with the size of the original image.

As shown in FIG. 5, in step S32, in an exemplified description, the connected domain analysis is performed on the binary images according to the preset pixel adjacency relationship to obtain the connected domain states. For example, the preset adjacency relationship can be set as four pixel points being adjacent. That is, for a central pixel point, there is one adjacent pixel in each of four directions: up, down, left, and right, that is, there are a total of four adjacent pixel points. If pixel point P1 is adjacent to pixel point P2, it is considered that P1 and P2 are connected. If P2 is also connected to pixel P3, it is also considered that P1 and P3 are also connected. The connected pixel points can form a region, and disconnected points form different regions. In some implementation processes, a connected region marking function in Matrix&Laboratory (Matlab) software can be used to traverse the binary image, equivalent pairs of continuous cluster regions and labels in each row or column are recorded, and the binary image is remarked by means of the equivalent pairs to obtain the connected domain result of the binary image. In some other implementation processes, a depth of the binary image can also be used to replace the equivalent pair to obtain the connected domain result.

As shown in FIG. 5, in step S33, in an exemplified description, the local images corresponding to the categories to be enhanced are obtained, according to connected domain states, from the original image, regions of interest the local images are cut to obtain and the instance images, and a plurality of the instance images corresponding to the categories to be enhanced are separately stored. For example, the connected domain states are drawn into label coordinate maps of different connected domains. By comparing the label coordinate maps, local images corresponding to the connected domains are extracted from the original image as the instance images. Regions of Interest (ROIs) of the instance images can also be obtained. Meaningless regions around the instance images are cut away, and ROI instance images are remained. Then, the same operation is performed on all original images to obtain the local images, corresponding to each category to be enhanced, in all the original images as the instance images, and different instance images of different categories to be enhanced are separately stored, so that any number of instance images in the same category to be enhanced can be subsequently selected for image pasting.

Figure 6:
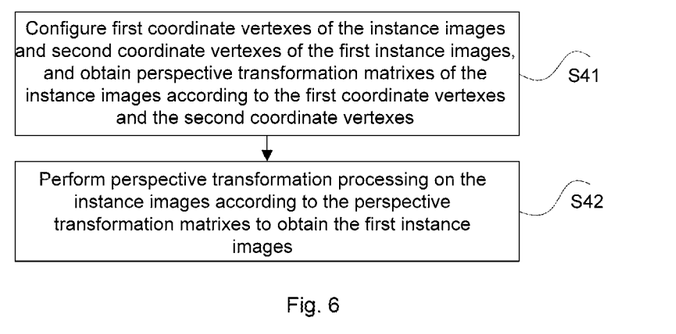
FIG. 6 is a flowchart of obtaining first instance images according to one or more embodiments.

After the instance images corresponding to the categories to be enhanced are obtained, and before the instance images are pasted, the perspective rationality of the instance images needs to be analyzed and guaranteed. As shown in FIG. 6, the step that perspective processes are performed on the instance images to obtain first instance images includes:

S41: First coordinate vertexes of the instance images and second coordinate vertexes of the first instance images are configured, and perspective transformation matrixes of the instance images are obtained according to the first coordinate vertexes and the second coordinate vertexes.

S42: Perspective transformation processing is performed on the instance images according to the perspective transformation matrixes to obtain the first instance images.

Through the above steps, the perspective rationality of the instance images used for being pasted to the original image may be improved, and a true semantic situation of the image can be considered, so that possible spatial relationships among different objects conform to the common sense.

As shown in FIG. 6, in step S41, in an exemplified description, the first coordinate vertexes of the instance images and the second coordinate vertexes of the first instance images are configured, and the perspective transformation matrixes of the instance images are obtained according to the first coordinate vertexes and the second coordinate vertexes. For example, for a current instance image, a getPerspectiveTransform function in the OpenCV image processing library can be selected; the quadrilateral vertex coordinates of the instance image are taken as the input data of the function; the quadrilateral vertex coordinates of a first instance image transformed by stretching, contraction, and other operations are taken as output data of the function, so as to calculate the perspective transformation matrix.

As shown in FIG. 6, in step S42, in an exemplified description, the perspective transformation processing is performed on the instance images according to the perspective transformation matrixes to obtain the first instance images. For example, a cvWarpPerspective function in the OpenCV image processing library can be selected to perform the perspective transformation processing on the instance images according to the perspective transformation matrixes to obtain the first instance images.

Figure 7:
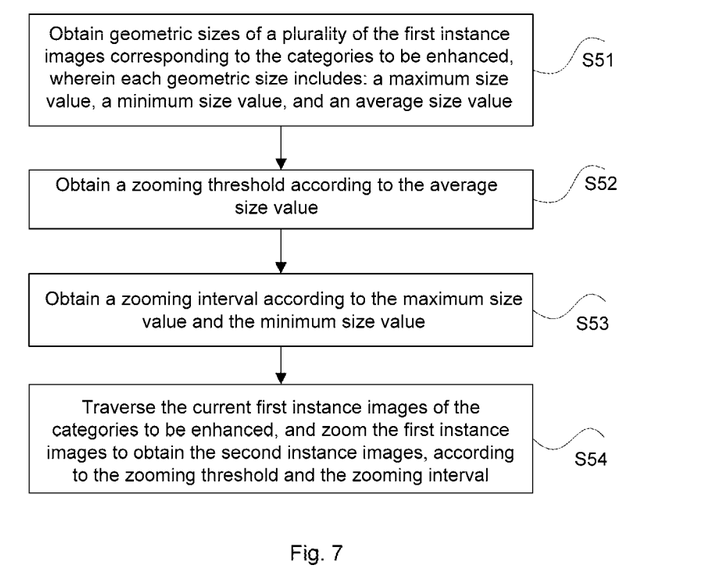
FIG. 7 is a flowchart of obtaining second instance images according to one or more embodiments.

After the first instance images subjected to the perspective transformation processing is obtained, there may be a case where the sizes of some first instance images are too large or too small. Therefore, as shown in FIG. 7, the step that the first instance images are zoomed according to geometric sizes of the first instance images to obtain second instance images includes:

S51: Geometric sizes of a plurality of the first instance images corresponding to the categories to be enhanced are obtained, wherein each geometric size includes: a maximum size value, a minimum size value, and an average size value.

S52: A zooming threshold is obtained according to the average size value.

S53: A zooming interval is obtained according to the maximum size value and the minimum size value.

S54: The current first instance images of the categories to be enhanced are traversed, and the first instance images are zoomed to obtain the second instance images according to the zooming threshold and the zooming interval.

Through the above steps, images with a small target size among the first instance images are zoomed in, and images with a large target size are zoomed out, so as to improve the perspective rationality and distribution rationality of the subsequent enhanced image.

As shown in FIG. 7, in step S51, in an exemplified description, the geometric sizes of the plurality of the first instance images corresponding to the categories to be enhanced are obtained. For example, a target category with the highest recognition accuracy is selected from all the target categories, and a minimum length value Hmin, a maximum length value Hmax, and a mean length value Hmean of the instance image corresponding to the category are calculated. In some implementation processes, a minimum width value Wmin, a maximum width value Wmax, and an average width value Wmean of the instance image corresponding to the category can also be calculated for subsequently obtaining the zooming threshold. That is, the target category with the highest recognition accuracy is taken as a reference value of the zooming threshold.

As shown in FIG. 7, in step S52, in an exemplified description, the zooming threshold is obtained according to the average size value. For example, the zooming threshold of T3=0.8 can be set. For the first instance image corresponding to each category to be enhanced, if its length is less than T3*Hmean, the length of the instance image is zoomed in. If its length is greater than T3*Hmean, the length of the instance image is zoomed out. In some implementation processes, the zooming threshold T3 can also be set to be 0.7, and the average width value Wmean of the instance images corresponding to the target category with the highest recognition accuracy is multiplied by T3, as a condition for determining to zoom in or zoom out the width of the instance images corresponding to the categories to be enhanced. For example, for the first instance image corresponding to each category to be enhanced, if its width is less than T3*Wmean, the width of the instance image is zoomed in. If its width is greater than T3*Wmean, the width of the instance image is zoomed out, so that the sizes of the instance images corresponding to the categories to be enhanced are based on the instance images corresponding to the target category with the highest recognition accuracy, and it is more rational to zoom out or in the image.

As shown in FIG. 7, in step S53, in an exemplified description, the zooming interval is obtained according to the maximum size value and the minimum size value. For example, the minimum length value Hmin, the maximum length value Hmax, the mean length value Hmean, as well as the minimum width value Wmin, the maximum width value Wmax, and the mean width value Wmean of the instance image corresponding to the target category with the highest recognition accuracy are obtained. For one instance image in the categories to be enhanced, if its length is H, a zoom-in multiple interval can be set to be [1, Hmax/H], and a zoom-out multiple interval can be set to be [Hmin/H, Hmax/H]. Further, for one instance image in the categories to be enhanced, if its width is W, a zoom-in multiple interval can be set to be [1, Wmax/W], and a zoom-out multiple interval can be set to be [Wmin/W, Wmax/W], so that the zoom-in multiple intervals and the zoom-out multiple intervals of the image are more rational.

As shown in FIG. 7, in step S54, in an exemplified description, the first instance images are zoomed according to the zooming threshold and the zooming interval to obtain the second instance images. For example, starting from the first target category among the categories to be enhanced, all instance images corresponding to the target category are compared based on their respective length and width sizes and the zooming threshold, and corresponding zoom-in or zoom-out operations are correspondingly performed according to comparison results; and zooming is performed according to the zoom-in and zoom-out multiple intervals until all the instance images corresponding to all the target categories among the categories to be enhanced are correspondingly zoomed. In this way, the first instance images subjected to the perspective transformation processing is rationally zoomed to obtain the second instance images.

Figure 8:
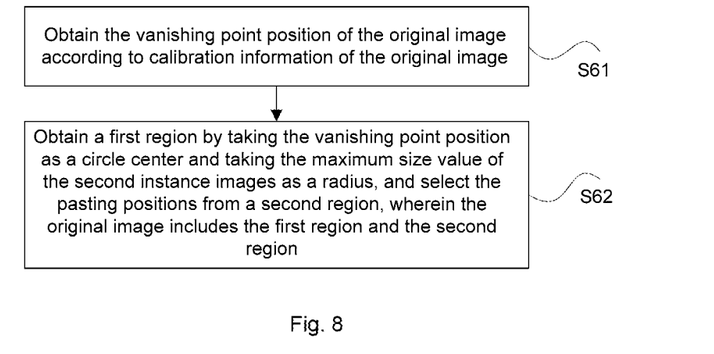
FIG. 8 is a flowchart of obtaining pasting positions according to one or more embodiments.

After the second instance images are obtained, proper pasting positions need to be obtained from the original image, as shown in FIG. 8, the step that a vanishing point position is obtained from the original image, and pasting positions of the second instance images are determined according to the vanishing point position and geometric sizes of the second instance images includes:

S61: The vanishing point position of the original image is obtained according to calibration information of the original image.

S62: A first region is obtained by taking the vanishing point position as a circle center and taking the maximum size value of the second instance images as a radius, and the pasting positions are selected from a second region, wherein the original image includes the first region and the second region.

Through the above steps, the pasting positions of the second instance images in the original image can be away from the vanishing point position of the original image, thereby improving the rational perspectively and authenticity of the enhanced image after the local images are pasted. As shown in FIG. 8, in step S61, in an exemplified description, the vanishing point position of the original image is obtained according to calibration information of the original image. For example, the vanishing point position of the original image is determined by means of the calibration information of a camera that captures the original image. A vanishing point can be considered as a pixel point formed by projecting a point at infinity on a spatial straight line onto an image. In some implementation processes, the vanishing point position of the original image can also be obtained by means of Hough transformation, RANdom SAmple Consensus (RANSAC) transformation, and the like.

As shown in FIG. 8, in step S62, in an exemplified description, a first region is obtained by taking the vanishing point position as a circle center and taking the maximum size value of the second instance image as a radius, and the pasting position is selected from a second region. For example, for the second instance image of a target category among the categories to be enhanced, a maximum length value of the second instance image is calculated. By taking the maximum length value as a radius and taking the vanishing point position as a circle center, a circular region is formed as the first region in a region of the original image, and another region, which does not belong to the first region, in the region of the original image is used as the second region. Then, a point is randomly selected from the second region as the pasting position, and the second instance image is pasted to the original image according to the pasting position. In some implementation processes, by taking the vanishing point position as a circle center and taking a maximum length size of the instance image corresponding to the target category with the highest recognition accuracy as a radius, a circular region is formed as the first region in a region of the original image, and another region, which does not belong to the first region, in the region of the original image is used as the second region. Then, a point is randomly selected from the second region as the pasting position, and the second instance image is pasted to the original image according to the pasting position. In some implementation processes, a plurality of second instance images can be selected and pasted to the original image according to their corresponding pasting positions. A pasting value range of a pasting image can be set to be [0, 10]. In this way, the pasting positions of the second instance images in the original image is away from the vanishing point position of the original image, which ensures that the enhanced image pasted with the local images has rational perspectively and authenticity.

The above image data enhancement method has the following beneficial effects: The instance images are obtained by performing binarization and connected domain analysis on the original image; the instance images are subjected to perspective processes and zoomed to obtain the second instance images; then, the pasting positions are obtained according to the geometric size of the second instance images and the vanishing point position of the original image; and finally, the second instance images are pasted to the original image according to the pasting positions. In this way, the problems such as unreasonable enhanced data and difficulty in small sample recognition in an image segmentation process.

Figure 9:
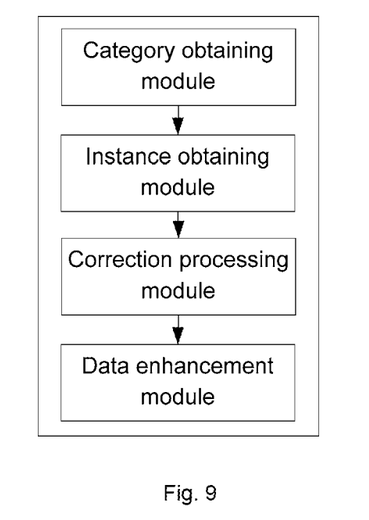
FIG. 9 is a structural block diagram of an image data enhancement apparatus according to one or more embodiments.

In an embodiment, as shown in FIG. 9, an image data enhancement apparatus is provided. The image data enhancement apparatus includes:

a category obtaining module, configured to: segment an original image to obtain segmented images and target categories of the segmented images, and obtain, by means of the target categories, categories to be enhanced;

an instance obtaining module, configured to: binarize the original image according to the categories to be enhanced to obtain binary images, and obtain, according to a connected domain of the binary images, from the original image, instance images having a matching relationship with the categories to be enhanced;

a correction processing module, configured to: perform perspective processes on the instance images to obtain first instance images, and zoom the first instance images to obtain second instance images; and a data enhancement module, configured to: obtain a vanishing point position from the original image, determine pasting positions of the second instance images according to the vanishing point position and geometric sizes of the second instance images, and paste the second instance images to the original image according to the pasting positions to obtain an enhanced image of the original image.

In the category obtaining module, in an exemplified description, the original image is segmented to obtain the segmented images and the target categories corresponding to the segmented images, thus obtaining the categories to be enhanced. For example, a data set of the original image is trained in an image segmentation network, and a deep neural network feature extraction module is constructed using dilated convolution to obtain a semantic feature of the original image. ASPP is used to perform the dilated convolution and sampling on feature information to obtain image context information in different ratios. Then, the semantic feature is combined with the image context information, and the segmented images are obtained by means of convolution in a preset size and sampling at a preset multiple. In some implementation process, the preset size used during the convolution can be set to be 3*3. The preset multiple used during the sampling can be set to be 16 times. Existing target categories are determined according to the segmented images, and confusion matrix analysis is performed on the segmented images. Prediction results of all the categories of the segmented images are compared with a real result of the original image. A certain number of target categories are selected, according to a preset comparison dimension, from the target categories as the categories to be enhanced. The comparison dimension can be the numbers of pixels of the target categories or recognition accuracies of the target categories, and the numbers of pixels of the target categories and the recognition accuracies of the target categories can also be combined to be the comparison dimension, so as to improve sample imbalance. The target categories are specifically selected for enhancement.

In the instance obtaining module, in an exemplified description, the original image is binarized to obtain the binary images; the connected domain analysis is performed on the binary images to obtain the instance images, having the matching relationship with the categories to be enhanced, in the original image. For example, starting from the first image of the original image, the original image is binarized according to the categories to be enhanced, and a mask matrix is constructed. Matrix multiplication operation is performed on the mask matrix and the original image to obtain the binary image; the connected domain analysis is performed on the binary image; the preset adjacency relationship can be set as four pixel points being adjacent; that is, for a central pixel point, there is one adjacent pixel in each of four directions: up, down, left, and right, that is, there are a total of four adjacent pixel points; and a connected domain diagram is obtained. Or, the preset adjacency relationship can be set as eight pixel points being adjacent; that is, for a central pixel point, there is one adjacent pixel in each of eight directions: up, down, left, right, up left, down left, up right, and down right, that is, there are a total of eight adjacent pixel points. In this way, a corresponding local image in the original image is extracted and is cut to obtain a region of interest and cut away a meaningless region from the image, and the instance image is obtained; the same operation is performed on all the images in the original image; the instance images corresponding to the various categories to be enhanced are extracted, and different instance images of different categories to be enhanced are separately stored, so as to select the corresponding instance images from the original image in the targeted manner according to the categories to be enhanced. That is, the target categories are screened to improve the imbalance of samples.

In the correction processing module, in an exemplified description, the perspective processes are performed on the instance images to obtain the first instance images, and the first instance images are zoomed to obtain the second instance images. For example, a perspective transformation function in an OpenCV image processing library can be used to perform the perspective processes on the instance images to obtain the first instance images with rational perspectivity. Then, the length size of the instance images corresponding to a target category with the highest recognition accuracy is used as a comparison reference; the length sizes of all the first instance images are matched with the comparison reference; the first instance images with larger length sizes are zoomed out, and the first instance images with smaller length sizes are zoomed in, so as to obtain the second instance images. In some implementation process, the width size of the instance image corresponding to the target category with the highest recognition accuracy is used as a comparison reference; the widths sizes of all the first instance images are matched with the comparison reference; the first instance images with larger width sizes are zoomed out, and the first instance images with smaller width sizes are zoomed in, so as to obtain the second instance images. In some other implementation processes, the length size and the width size can also be simultaneously considered, so as to further ensure the authenticity and perspective rationality of the instance images.

In the data enhancement module, in an exemplified description, the vanishing point position is obtained from the original image, and the pasting positions of the second instance images are determined according to the vanishing point position and the geometric size of the second instance images. The second instance images are then pasted to the original image according to the pasting positions to obtain the enhanced image of the original image, for example, the vanishing point position in the original image can be confirmed by means of calibration information of a camera, or the vanishing point position can be obtained by means of Hough transformation. Then, a region where pasting is forbidden is formed in the original image according to the vanishing point position in the original image. For example, for the second instance image of a target category among the categories to be enhanced, a maximum length or width value of the second instance image is calculated; by taking the maximum length or width value as a radius and taking the vanishing point position as a circle center, a circular region is formed as the first region in a region of the original image, and another region, which does not belong to the first region, in the region of the original image is used as the second region. Then, a pasting point position is randomly selected from the second region, and the second instance image is pasted to the original image according to the pasting point position, thus obtaining the enhanced image corresponding to the original image. In some implementation processes, a plurality of second instance images can be pasted to the original image to achieve data amplification on the original image with a small number of samples, which improves the recognition accuracy of small samples and ensures the perspective rationality of the enhanced image.

In some other implementation processes, the above image data enhancement apparatus can also be applied to the data enhancement process in the field of target detection.

The apparatus described above can be applied to a scenario of performing data enhancement on image samples with imbalanced target categories. Based on ASPP and perspective transformation, the instance images are obtained by performing binarization and connected domain analysis on the original image; the instance images are subjected to perspective processes and zoomed to obtain the second instance images; then, the pasting positions are obtained according to the geometric size of the second instance images and the vanishing point position of the original image; and finally, the second instance images are pasted to the original image according to the pasting positions. The problems of sample imbalance during the enhancement of the image data, poor perspective rationality of the enhanced image, and the like in the existing image data enhancement technology may be improved.

The specific limitations of the image data enhancement apparatus can be found in the limitations on the image data enhancement method described above, which will not be elaborated here. Each module in the image data enhancement apparatus may be implemented entirely or partially through software, hardware, or a combination thereof. The above modules can be embedded in or independent of a processor in a computer device in a hardware form, or stored in a memory in the computer device in a software form, for the processor to invoke and execute the operations corresponding to the above modules.

Figure 10:
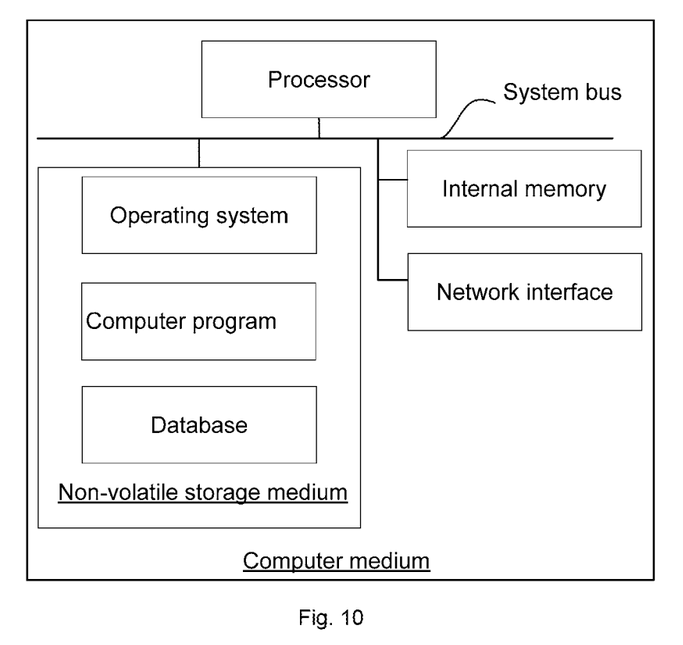
FIG. 10 is a diagram of an internal structure of a computer device according to one or more embodiments.

In an embodiment, a computer device is provided. The computer device may be a server, a diagram of an internal structure of which can be as shown in FIG. 10. The computer device includes a processor, a memory, a network interface, and a database which are connected through a system bus. The processor of the computer device is configured to provide computation and control abilities. The memory of the computer device includes a non-volatile storage medium and an internal memory. The non-volatile storage medium stores an operating system, a computer program, and a database. The internal memory provides an environment for running the operating system and the computer program in the non-volatile storage medium. The database of the computer device is configured to store data for image data enhancement. The network interface of the computer device is configured to communicate with an external terminal through network connection. The computer program is executed by the processor to implement an image data enhancement method.

A person skilled in the art may understand that, the structure shown in FIG. 10 is merely a block diagram of partial structures related to a solution in the present application, and does not constitute a limitation on the computer device to which the solution of the present application is applied. Specifically, the computer device may include more components or fewer components than those shown in the figure, or some components may be combined, or a different component deployment may be used.

In an embodiment, a computer device is provided, including a memory and one or more processors, wherein the memory stores computer-readable instructions; and the computer-readable instructions, when executed by the processors, cause the one or more processors to perform the following steps:

an original image is segmented to obtain segmented images and target categories of the segmented images, and categories to be enhanced are obtained by means of the target categories;

the original image is binarized according to the categories to be enhanced to obtain binary images, and instance images having a matching relationship with the categories to be enhanced are obtained, according to a connected domain of the binary images, from the original image;

perspective processes are performed on the instance images to obtain first instance images, and the first instance images are zoomed to obtain second instance images; and a vanishing point position is obtained from the original image, pasting positions of the second instance images are determined according to the vanishing point position and geometric sizes of the second instance images, and the second instance images are pasted to the original image according to the pasting positions to obtain an enhanced image of the original image.

In an embodiment, one or more non-volatile computer-readable storage media storing computer-readable instructions are provided, wherein the computer-readable instructions, when executed by one or more processors, cause the one or more processors to perform the following steps:

an original image is segmented to obtain segmented images and target categories of the segmented images, and categories to be enhanced are obtained by means of the target categories;

the original image is binarized according to the categories to be enhanced to obtain binary images, and instance images having a matching relationship with the categories to be enhanced are obtained, according to a connected domain of the binary images, from the original image;

perspective processes are performed on the instance images to obtain first instance images, and the first instance images are zoomed to obtain second instance images; and a vanishing point position is obtained from the original image, pasting positions of the second instance images are determined according to the vanishing point position and geometric sizes of the second instance images, and the second instance images are pasted to the original image according to the pasting positions to obtain an enhanced image of the original image.

A person of ordinary skill in the art may understand that all or some of the procedures of the method in the foregoing embodiments may be implemented by the computer-readable instructions that instruct relevant hardware. The computer program may be stored in a non-volatile computer-readable storage medium. When the computer program is executed, the procedures of the foregoing method embodiments may be implemented. Any reference to the memory, the database, or other media used in the embodiments provided in the present application can include a non-volatile memory and/or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory can include a random access memory (RAM) or an external cache memory. As an explanation rather than limitation, the RAM can be obtained in various forms, such as a static RAM (SRAM), a dynamic RAM (DRAM), a synchronous DRAM (SDRAM), a double data rate SDRAM (DDRS- DRAM), an enhanced SDRAM (ESDRAM), a synchronous link (Synchlink) DRAM (SLDRAM), a Rambus direct RAM (RDRAM), a direct memory bus dynamic RAM (DRDRAM), and a memory bus dynamic RAM (RDRAM).

All the technical features of the above embodiments can be combined randomly. For the sake of brevity, all possible combinations of all the technical features in the above embodiments are not described. However, these technical features shall all be considered to fall within the scope of this specification as long as there is no contradiction in their combinations.

The foregoing embodiments merely express several implementations of the present application. The descriptions thereof are relatively specific and detailed, but are not understood as limitations on the scope of the patent of the disclosure. A person of ordinary skill in the art can 5 also make several transformations and improvements without departing from the idea of the present application. These transformations and improvements fall within the protection scope of the present application. Therefore, the protection scope of the patent of the present application shall be subject to the appended claims.

What is claimed is:

1. An image data enhancement method, comprising:
segmenting an original image to obtain segmented images and target categories of the segmented images, and obtaining, by means of the target categories, categories to be enhanced;
binarizing the original image according to the categories to be enhanced to obtain binary images, and obtaining, according to a connected domain of the binary images, from the original image, instance images having a matching relationship with the categories to be enhanced;
performing perspective processes on the instance images to obtain first instance images, and zooming the first instance images to obtain second instance images; and
obtaining a vanishing point position from the original image, determining pasting positions of the second instance images according to the vanishing point position and geometric sizes of the second instance images, and pasting the second instance images to the original image according to the pasting positions to obtain an enhanced image of the original image.

2. The image data enhancement method according to claim 1, wherein the step of segmenting an original image to obtain segmented images and target categories of the segmented images comprises:
performing feature extraction on the original image to obtain a multilayer semantic feature of the original image;
convoluting and downsampling the multilayer semantic feature according to a preset sampling rate to obtain a first sampled feature; and
upsampling the first sampled feature to obtain a second sampled feature, fusing the second sampled feature with the multilayer semantic feature to obtain a third sampled feature, and convoluting and upsampling the third sampled feature to obtain the segmented images and the target categories corresponding to the segmented images.

3. The image data enhancement method according to claim 2, wherein the step of upsampling the first sampled feature to obtain a second sampled feature comprises:
using interpolation method to interpolate new pixels between pixel points in the first sampled features to obtain the second sampled features.

4. The image data enhancement method according to claim 1, wherein the step of obtaining, by means of the target categories, categories to be enhanced comprises:
analyzing, by means of a confusion matrix, the segmented images according to the target categories to obtain recognition accuracies of the target categories;
comparing the recognition accuracies of the target categories with a preset first threshold, and taking a corresponding target category with the recognition accuracy less than the first threshold as a first target category;
comparing the numbers of pixels of the target categories with a preset second threshold, and taking a corresponding target category with the number of pixels less than the second threshold as a second target category; and
fusing the first target categories with the second target categories to obtain the categories to be enhanced.

5. The image data enhancement method according to claim 4, wherein each row in the confusion matrix represents an actual category, and each column in the confusion matrix represents a prediction result of each category.

6. The image data enhancement method according to claim 4, wherein the step of fusing the first target categories with the second target categories to obtain the categories to be enhanced comprises:
combining the first target categories with the second target categories, or merging elements in the first target categories with elements in the second target categories.

7. The image data enhancement method according to claim 4, the method comprises:
allocating a larger weight to target category element in respond to the element in the first target category and in the second target category are the same;
allocating a smaller weight to target category element in respond to the element appears in the first target category or appears in the second target category.

8. The image data enhancement method according to claim 1, wherein the step of binarizing the original image according to the categories to be enhanced to obtain binary images, and obtaining, according to a connected domain of the binary images, from the original image, instance images having a matching relationship with the categories to be enhanced comprises:
building mask matrixes according to the categories to be enhanced and a matrix size of the original image, and performing matrix multiplication operations on elements of the mask matrixes and elements of the original image to obtain the binary images;
obtaining connected domain states of the binary images according to a preset pixel adjacency relationship; and
obtaining, according to the connected domain states, from the original image, local images corresponding to the categories to be enhanced, and cutting regions of interest of the local images to obtain the instance images, and separately storing a plurality of the instance images corresponding to the categories to be enhanced.

9. The image data enhancement method according to claim 8, wherein the step of obtaining connected domain states of the binary images according to a preset pixel adjacency relationship comprises:
using a connected region marking function to traverse each binary image, recording equivalent pairs of continuous cluster regions and labels in each row or column, and remarking the binary image by means of the equivalent pairs to obtain the connected domain state of the binary image.

10. The image data enhancement method according to claim 8, wherein the step of obtaining connected domain states of the binary images according to a preset pixel adjacency relationship comprises:
using a connected region marking function to traverse each binary image, recording depths of continuous cluster regions and labels in each row or column, and remarking the binary image by means of the depths to obtain the connected domain state of the binary image.

11. The image data enhancement method according to claim 8, wherein the step of obtaining, according to the connected domain states, from the original image, local images corresponding to the categories to be enhanced comprises:
drawing the connected domain states into label coordinate maps of different connected domains, and extracting local images corresponding to the connected domains from the original image by comparing the label coordinate maps.

12. The image data enhancement method according to claim 1, wherein
the step of performing perspective processes on the instance images to obtain first instance images comprises:
configuring first coordinate vertexes of the instance images and second coordinate vertexes of the first instance images, and obtaining perspective transformation matrixes of the instance images according to the first coordinate vertexes and the second coordinate vertexes; and
performing perspective transformation processing on the instance images according to the perspective transformation matrixes to obtain the first instance images.

13. The image data enhancement method according to claim 1, wherein the step of zooming the first instance images to obtain second instance images comprises:
obtaining geometric sizes of a plurality of the first instance images corresponding to the categories to be enhanced, wherein each geometric size comprises: a maximum size value, a minimum size value, and an average size value;
obtaining a zooming threshold according to the average size value;
obtaining a zooming interval according to the maximum size value and the minimum size value; and
traversing the current first instance images of the categories to be enhanced, and zooming the first instance images to obtain the second instance images according to the zooming threshold and the zooming interval.

14. The image data enhancement method according to claim 13, wherein the step of obtaining geometric sizes of a plurality of the first instance images corresponding to the categories to be enhanced comprises:
selecting a target category with the highest recognition accuracy from all the target categories, and calculating a minimum length value Hmin, a maximum length value Hmax, a mean length value Hmean, a minimum width value Wmin, a maximum width value Wmax, and an average width value Wmean of the instance image corresponding to the category.

15. The image data enhancement method according to claim 14, wherein the step of obtaining a zooming interval according to the maximum size value and the minimum size value comprises:

obtaining the minimum length value Hmin, the maximum length value Hmax, the mean length value Hmean, the minimum width value Wmin, the maximum width value Wmax, and the mean width value Wmean of the instance image corresponding to the target category with the highest recognition accuracy;
for one instance image with length H in the categories to be enhanced, setting a zoom-in multiple interval to be [1, Hmax/H], and setting a zoom-out multiple interval to be [Hmin/H, Hmax/H];
for one instance image with width W in the categories to be enhanced, setting a zoom-in multiple interval to be [1, Wmax/W], and setting a zoom-out multiple interval to be [Wmin/W, Wmax/W].

16. The image data enhancement method according to claim 1, wherein the step of obtaining a vanishing point position from the original image, and determining pasting positions of the second instance images according to the vanishing point position and geometric sizes of the second instance images comprises:
obtaining the vanishing point position of the original image according to calibration information of the original image; and
obtaining a first region by taking the vanishing point position as a circle center and taking the maximum size value of the second instance images as a radius, and selecting the pasting positions from a second region, wherein the original image comprises the first region and the second region.

17. The image data enhancement method according to claim 16, wherein the step of obtaining the vanishing point position of the original image according to calibration information of the original image comprises:
determining the vanishing point position of the original image by means of the calibration information of a camera that captures the original image.

18. The image data enhancement method according to claim 16, wherein the step of obtaining a first region by taking the vanishing point position as a circle center and taking the maximum size value of the second instance images as a radius, and selecting the pasting positions from a second region comprises:
obtaining the first region by taking the vanishing point position as a circle center and taking a maximum length size of the instance image corresponding to the target category with the highest recognition accuracy as a radius in a region of the original image;
determining another region, which does not belong to the first region, in the original image as the second region;
randomly selecting a point from the second region as the pasting position.

19. A computer device, comprising a memory and one or more processors, wherein the memory stores computer-readable instructions; and the computer-readable instructions, in respond to executed by the one or more processors, cause the one or more processors to perform the following steps:
segmenting an original image to obtain segmented images and target categories of the segmented images, and obtaining, by means of the target categories, categories to be enhanced;
binarizing the original image according to the categories to be enhanced to obtain binary images, and obtaining, according to a connected domain of the binary images, from the original image, instance images having a matching relationship with the categories to be enhanced;

performing perspective processes on the instance images to obtain first instance images, and zooming the first instance images to obtain second instance images; and obtaining a vanishing point position from the original image, determining pasting positions of the second instance images according to the vanishing point position and geometric sizes of the second instance images, and pasting the second instance images to the original image according to the pasting positions to obtain an enhanced image of the original image.

20. One or more non-transitory computer-readable storage media storing computer-readable instructions, wherein the computer-readable instructions, in respond to executed by one or more processors, cause the one or more processors to perform the following steps:

segmenting an original image to obtain segmented images and target categories of the segmented images, and obtaining, by means of the target categories, categories to be enhanced;

binarizing the original image according to the categories to be enhanced to obtain binary images, and obtaining, according to a connected domain of the binary images, from the original image, instance images having a matching relationship with the categories to be enhanced;

performing perspective processes on the instance images to obtain first instance images, and zooming the first instance images to obtain second instance images; and obtaining a vanishing point position from the original image, determining pasting positions of the second instance images according to the vanishing point position and geometric sizes of the second instance images, and pasting the second instance images to the original image according to the pasting positions to obtain an enhanced image of the original image.

* * * * *